O. E. RUHOFF.
ELECTRIC BATTERY AND METHOD OF OPERATION.
APPLICATION FILED JAN. 20, 1920.
1,358,334.   Patented Nov. 9, 1920.
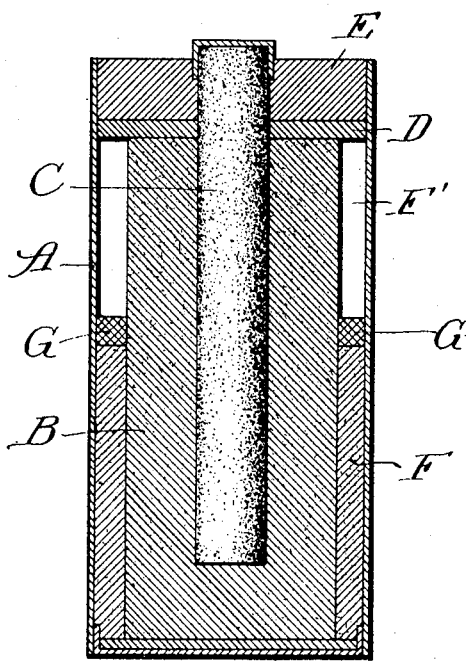 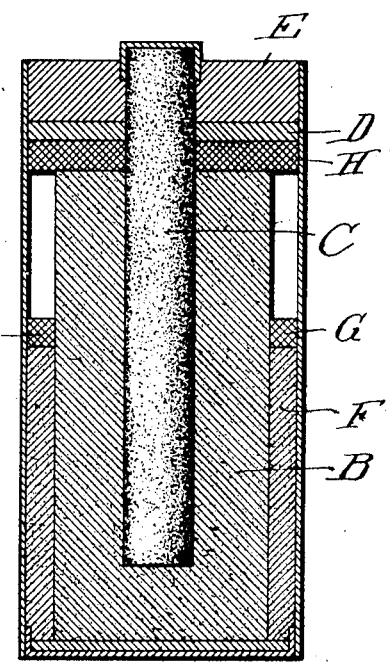
Inventor:
Otto E. Ruhoff,

UNITED STATES PATENT OFFICE.

OTTO E. RUHOFF, OF MADISON, WISCONSIN, ASSIGNOR TO FRENCH BATTERY & CARBON CO., OF MADISON, WISCONSIN, A CORPORATION OF WISCONSIN.

ELECTRIC BATTERY AND METHOD OF OPERATION.

1,358,334.   Specification of Letters Patent.   Patented Nov. 9, 1920.

Application filed January 20, 1920. Serial No. 352,823.

*To all whom it may concern:*

Be it known that I, OTTO E. RUHOFF, a citizen of the United States, residing at Madison, in the county of Dane and State of Wisconsin, have invented a new and useful Improvement in Electric Batteries and Methods of Operation, of which the following is a specification.

This invention relates particularly to dry cell batteries and a method of operating the same; and the primary object is to provide a dry cell which will give a more uniform discharge and greater ultimate efficiency, than dry cells of known construction. A further object is to provide an improved method of operation.

The invention is illustrated, in its preferred embodiment, in the accompanying drawing, in which—

Figure 1 represents a sectional view of a dry cell embodying the invention; and Fig. 2, a sectional view, illustrating a slight modification.

Referring to Fig. 1, A represents a zinc container which affords a positive electrode; B, a compact core or depolarizing mixture, usually a mixture of manganese dioxid and powdered carbonaceous material; C, a carbon electrode embedded in the core B and having its upper end projecting slightly above the container; D, a disk, or washer, disposed above the core B; E, a seal of pitch or other suitable sealing material filling the upper end of the container, such sealing material usually being poured in upon the disk D and setting in a mass embedding the upper portion of the carbon electrode C, the electrode extending slightly above the outer surface of the seal, however; F, electrolyte filling the lower portion of the annular space between the core and the container, the upper portion F' of said annular space being left unfilled; and G, a packing washer of cotton or other suitable material compacted in the annular space just above the electrolyte F. The electrolyte usually comprises ammonium chlorid, zinc chlorid, water and starch, or materials containing starch, the starch being gelatinized, so that the electrolyte is in the form of a stiff jelly or paste. As illustrated, the space F' surrounds a substantial portion of the core B. It is preferred to fill the space about half full of electrolyte, as illustrated. In the operation of the battery, the electrolyte F expands, and I utilize such expansion to automatically throw into operative relation successive portions of the core and container. The packing G is forced into the space under considerable pressure, the purpose being to create such frictional contact that as the electrolyte F expands in the operation of the battery, a counter-pressure will be created which tends to keep the electrolyte compacted, so that it will fill or bridge the space between the core and the can, thus insuring good contact as the expansion of the electrolyte progresses. The packing G will be forced progressively to the upper end of the annular space, thus automatically throwing more and more of the core and the can into operative relation through the medium of the expanding electrolyte. It is important to apply the counter-pressure to keep the electrolyte compacted as far as practicable to insure good contact of the electrolyte with the core and can, so that the space may be properly bridged by the electrolyte.

The core B may be inclosed in a gauze sack or other bibulous cover, or may be left uncovered, if properly made.

In the modification shown in Fig. 2, the construction is the same as described, except that the core B is made of less height, and a packing disk, or washer, H, of cotton or other compressible material, is interposed below the disk D. The operation is the same as has been described, except that when the packing ring G comes into contact with the packing H, a double thickness of the compressible material is disposed above the electrolyte, so that after the limit of compression is reached, the compacting force exerted upon the electrolyte is enhanced.

The gist of the present invention lies in applying counter-pressure to the expanding electrolyte where it is utilized to automatically throw successive portions of the core of depolarizing mixture and the can into operative relation, and in providing yielding means for producing such counter-pressure upon the electrolyte.

The foregoing detailed description has been given for clearness of understanding only and no unnecessary limitation should be understood therefrom, but the appended claims should be construed as broadly as permissible in view of the prior art.

What I regard as new and desire to secure by Letters Patent is:

1. In a dry cell, a receptacle affording a positive electrode, a carbon electrode therein having a core of depolarizing material thereon, sealing material closing the upper end of said receptacle, electrolyte filling the lower portion of the space between said core and the surrounding wall of the container, the upper portion of said space surrounding a substantial portion of said core being free to receive electrolyte as the same expands in the use of the cell, and means for creating counter-pressure upon the expanding electrolyte, whereby the expanding electrolyte is caused to bridge the space between the core and container and bring successive portions of the core and container into operative relation.

2. In a dry cell, a receptacle affording a positive electrode, a carbon electrode therein having a core of depolarizing material thereon, sealing material closing the upper end of said receptacle, electrolyte filling the lower portion of the space between said core and the surrounding wall of the container, the upper portion of said space surrounding a substantial portion of said core being free to receive electrolyte as the same expands in the use of the cell, and a packing washer disposed in said space immediately above said electrolyte for creating counter-pressure and tending to keep the electrolyte compacted as it expands in the use of the cell, whereby successive portions of the core and container are brought into operative relation in the use of the cell.

3. The method of operating a dry cell, which consists in introducing into the annular space between the core of depolarizing mixture and the can a quantity of electrolyte which will afford connection between a limited area of the core and the can, utilizing the expansion of the electrolyte as the cell operates to bring successive portions of the core and can into operative relation, and causing a counteracting force to be applied to the expanding electrolyte to keep it compacted between the core and can as the cell operates.

OTTO E. RUHOFF.